Sept. 14, 1943.                W. L. CARLSON                    2,329,248
                            MOTORCYCLE CONSTRUCTION
                              Filed Jan. 23, 1942
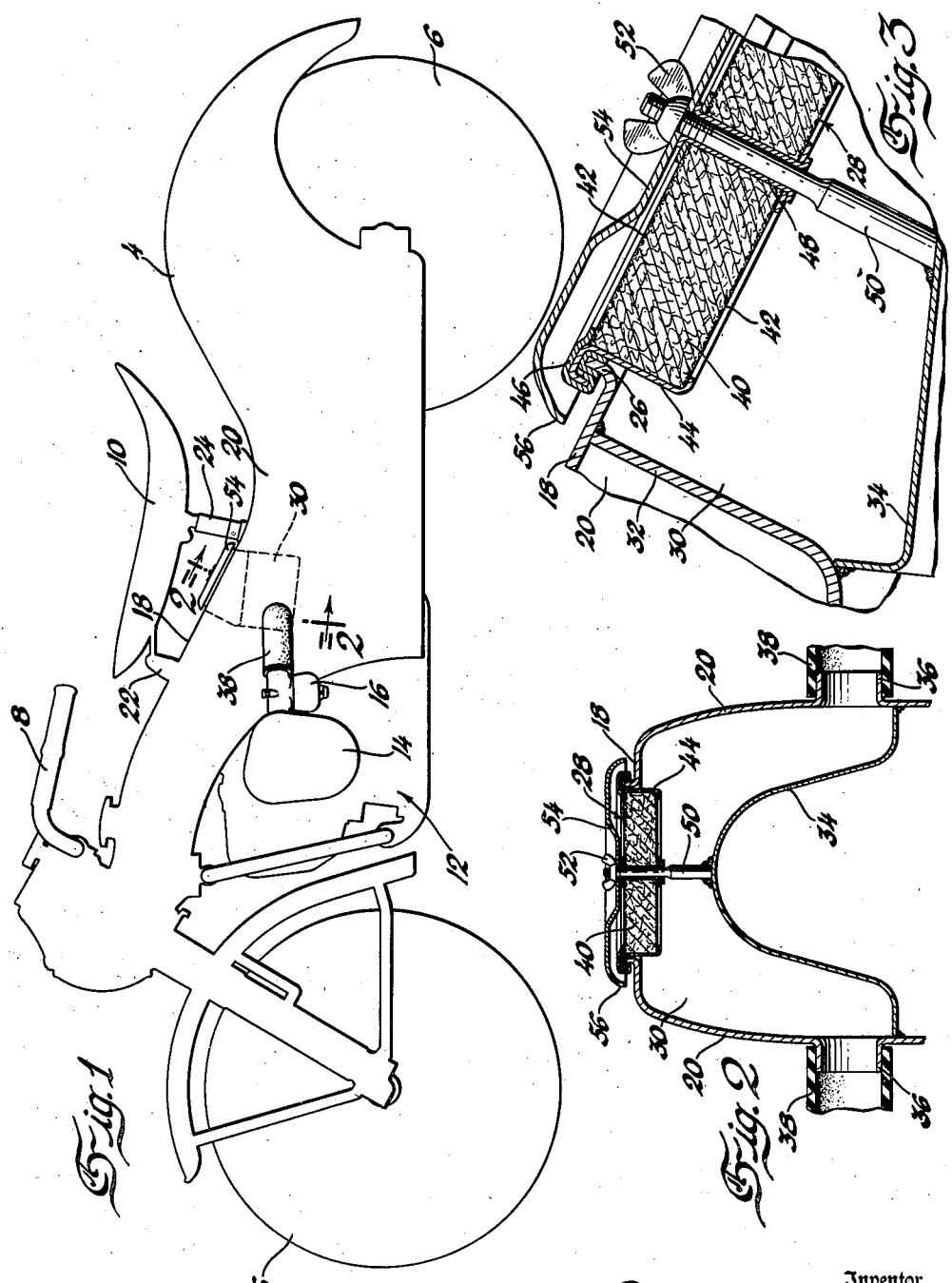
Inventor
Wilbur L. Carlson
By Blackmore, Spencer & Flint
Attorney Patented Sept. 14, 1943

2,329,248

UNITED STATES PATENT OFFICE 2,329,248

MOTORCYCLE CONSTRUCTION

Wilbur L. Carlson, Rochester, N. Y., assignor to General Motors Corporation, Detroit, Mich., a corporation of Delaware Application January 23, 1942, Serial No. 427,876

9 Claims. (Cl. 180—35)

The present invention relates generally to motorcycle construction and more particularly to the location and construction of an air filter for the motorcycle engine.

In present practice it is customary to provide filters for the air supply to carburetors of vehicle engines but the provision of an air filter on a motor cycle engine presents certain problems which are not encountered in automotive practice wherein the air filter together with other engine accessories may be conveniently located within the engine compartment.

It is highly desirable, for instance, that the air filter be so constructed and located as to be protected against physical damage and the entrance of an excessive amount of road dust, dirt and moisture. In motorcycles particularly adapted for military use, it has also been found desirable to locate the filter at a relatively high elevation to insure the proper functioning thereof when the motorcycle is operated across creeks or ditches or through accumulations of water which may be relatively deep.

It is therefore the principal object of the present invention to so construct and position the air filter on a motorcycle that the filter will be adequately protected against physical damage and the entrance of an excessive amount of road dust and water.

Other objects and the advantages of the present invention will be apparent from the following description of the embodiment thereof which is illustrated in the accompanying drawing in which:

Figure 1 is a diagrammatic side elevation of a motorcycle embodying the present invention.

Figure 2 is an enlarged, fragmentary, transverse section taken substantially on line 2—2 of Figure 1.

Figure 3 is an enlarged, fragmentary, longitudinal section through the filter and adjacent parts of the motorcycle frame.

Referring first to Figure 1, the motorcycle as a whole has been shown diagrammatically as including the frame 4, wheels 6, handle bars 8, saddle 10, and the power plant indicated generally at 12. The power plant may include any known type of engine but has been diagrammatically illustrated as a two cylinder opposed engine with the longitudinal axis of the cylinders arranged transversely of the frame 4. Only a single cylinder head 14 and carburetor 16 appear in the drawing but it will be understood that such parts are duplicated on the opposite side of the motorcycle from that shown in Figure 1. It will also be understood that the power plant will include the usual controls and accessories and will be provided with any suitable transmission and drive to the rear wheel.

The motorcycle frame 4 is shown as generally inverted U-shaped in cross section with a substantially horizontal wall 18 and substantially vertical depending walls 20 which are spaced to receive and form a housing for parts of the drive and power plant accessories with the frame extended rearwardly to form the rear wheel fender.

Directly beneath the front portion of the saddle 10 between the front end connection 22 thereof to the frame and the saddle post 24, the wall 18 of the frame 4 is provided with an opening defined by the upwardly extending flange 26 to receive a removable air filter unit indicated generally at 28. An enclosed air space 30 is provided within the frame 4 beneath the opening in wall 18 which is constituted by portions of the frame walls and sheet metal partitions within the walls such as shown at 32 and 34. Adjacent the lower portion of the air space 30 each of the frame side walls 20 is provided with an opening defined by the outwardly extending flange 36. These openings are substantially in horizontal alinement with the respective air intake passages of the carburetors on each side of the frame and are shown as connected thereto by conduits or elbows 38 which are preferably formed of rubber or similar flexible material to permit slight relative movement between the engine and motorcycle frame such as might occur by reason of vibration or a resilient mounting of the engine on the frame.

The air filter unit 28 may assume various forms but is shown as including any suitable filtering medium 40 such as copper mesh or gauze which is confined between screens 42 within a casing formed by the lower cup-shaped member 44 and upper member 46 which may be secured together as by crimping the edge of one member around the edge of the other member in the manner shown in Figure 3. The casing members 44 and 46 may also be secured together by a central hollow sleeve 48 which is adapted to receive the securing post 50. As indicated in Figure 3, the casing member 46 and the lower wall of the casing member 44 are provided with openings through which air may pass through such members and the filter medium and screens into the air space 30.

It will be apparent that the air filter unit 28 constitutes a self-contained unit which may be pre-assembled and readily removed and replaced whenever desired. The filter unit is adapted to be secured against the flange 26 of frame wall 18 by means of the wing nut 52 which is screw-threaded on the upper end of the post 50 with a cover 54 interposed between the nut 52 and the flanged upper end of the filter sleeve 48. This cover 54 is bent upwardly in spaced relation to the upper member 46 of the filter casing and formed with a depending peripheral flange 56 to provide a downwardly opening air inlet slot.

It will be seen that the location of the filter unit 28 under the saddle 10 and the mounting thereof within the frame 4 with the cover 54 affords an extremely adequate protection against physical damage. It will also be apparent that the filter unit is positioned at a relatively high level to reduce the entrance of road dust, dirt and moisture to a minimum.

Although shown and described in connection with a motorcycle of the two-wheeled type it will be understood that the filter location and mounting relative to the frame may be employed within the scope of the present invention in motor tricycle or three-wheeled motorcycle construction.

It will also be understood that I contemplate all such changes and modifications in the specific construction shown herein as may come within the scope of the appended claims.

I claim:

1. In a motorcycle, a frame, a saddle on said frame, an engine, a carburetor for said engine, said frame being provided with an opening directly under said saddle with portions of said saddle extending over said opening, and means to supply air to said carburetor including a closed passage extending from said opening to said carburetor.

2. The elements set forth in claim 1 in which an air filter is mounted within said frame opening.

3. In a motorcycle, a frame, a saddle on said frame, an engine, a carburetor for said engine, said frame including walls defining a hollow space under said saddle and provided with openings therein, an air filter in one of said openings, and a conduit extending from another of said openings to said carburetor.

4. In a motorcycle, a frame including a substantially horizontal wall, a saddle above said horizontal wall, an engine, a carburetor for said engine, said horizontal wall being provided with an opening under said saddle, and means to supply air to said carburetor including a closed passage extending from said opening to said carburetor.

5. In a motorcycle, a frame, an engine, a carburetor for said engine, said frame including a wall provided with an opening therein, an air filter detachably secured to said frame within said opening, and means defining a closed passage extending from said opening to said carburetor.

6. In a motorcycle, a frame, an engine, a carburetor for said engine, said frame including a substantially horizontal wall and depending spaced vertical walls and partitions forming therewith a hollow air space within said frame, said horizontal wall being provided with an air inlet opening and one of said vertical walls being provided with an air outlet opening, and a conduit extending from said air outlet opening to said carburetor.

7. In a motor cycle, a frame, a saddle on said frame, an engine, a pair of carburetors for said engine, said frame being provided with an opening under said saddle, and means to supply air to said carburetors including a passage communicating with said opening and separate conduits extending from said passage to said carburetors.

8. In a motorcycle, a longitudinally extending frame, an engine, a pair of carburetors for said engine, said carburetors being located at opposite sides of said frame, said frame including walls defining a hollow space within said frame, one of said walls being provided with an air inlet opening, an air filter in said opening, and conduits at opposite sides of said frame extending from said space to said carburetors.

9. In a motorcycle, a longitudinally extending frame, an engine, a pair of carburetors for said engine, said carburetors being located at opposite sides of said frame, said frame including a substantially horizontal wall and depending spaced vertical walls and partitions forming therewith a hollow air space within said frame, a saddle mounted on said frame above said space, said horizontal wall being provided with an air inlet opening under said saddle, an air filter mounted within said opening, said vertical walls being provided with air outlet openings, and conduits on opposite sides of said frame extending from said outlet openings to said carburetors.

WILBUR L. CARLSON